United States Patent
Means

[11] Patent Number: 5,833,286
[45] Date of Patent: Nov. 10, 1998

[54] POROUS MEMBRANE SEPARATOR

[76] Inventor: Jim Means, 1816 Emery, Denton, Tex. 76201

[21] Appl. No.: 920,802

[22] Filed: Aug. 29, 1997

[51] Int. Cl.⁶ .................................. B25J 1/00; B65H 3/22
[52] U.S. Cl. ................................................ 294/61; 294/1.1
[58] Field of Search ..................... 294/1.1, 5, 26, 294/50.5, 61; 30/162, 164.5–164.7, 358, 366, 368; 271/18.3

[56] References Cited

U.S. PATENT DOCUMENTS

| | | | |
|---|---|---|---|
| 51,677 | 12/1865 | Allamby et al. | 294/61 X |
| D. 362,590 | 9/1995 | Larson et al. | |
| 1,008,734 | 11/1911 | Ruehs | 30/164.5 X |
| 1,701,771 | 2/1929 | Di Stefano | 30/164.5 X |
| 3,183,031 | 5/1965 | Haberstick | 294/61 X |
| 3,380,092 | 4/1968 | Golczynski | 294/61 X |
| 3,797,875 | 3/1974 | den Hamer | 294/1.1 |
| 4,183,570 | 1/1980 | Broyles et al. | |
| 4,600,227 | 7/1986 | Ennis et al. | |
| 4,667,996 | 5/1987 | Gaspar | |
| 4,676,396 | 6/1987 | Mamolou | |
| 4,833,780 | 5/1989 | Pollock | 294/61 X |
| 5,251,943 | 10/1993 | Dalbo et al. | 294/1.1 |

*Primary Examiner*—Johnny D. Cherry
*Attorney, Agent, or Firm*—Haynes and Boone, L.L.P.

[57] ABSTRACT

The present invention provides a device with a protected grasping member for separating a flexible porous membrane from a stack of flexible porous membranes. The device includes a housing with a bore extending from one end of the housing and terminating at a cavity located at the mid portion of the housing; a stem reciprocatingly disposed in the bore and extending into the cavity; and a grasping member attached to an end portion of the stem for engaging the membrane.

5 Claims, 1 Drawing Sheet

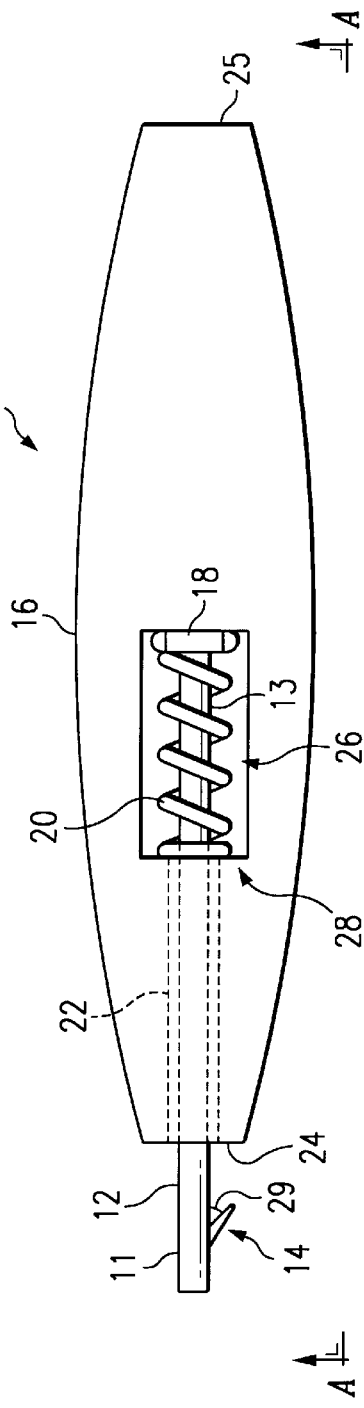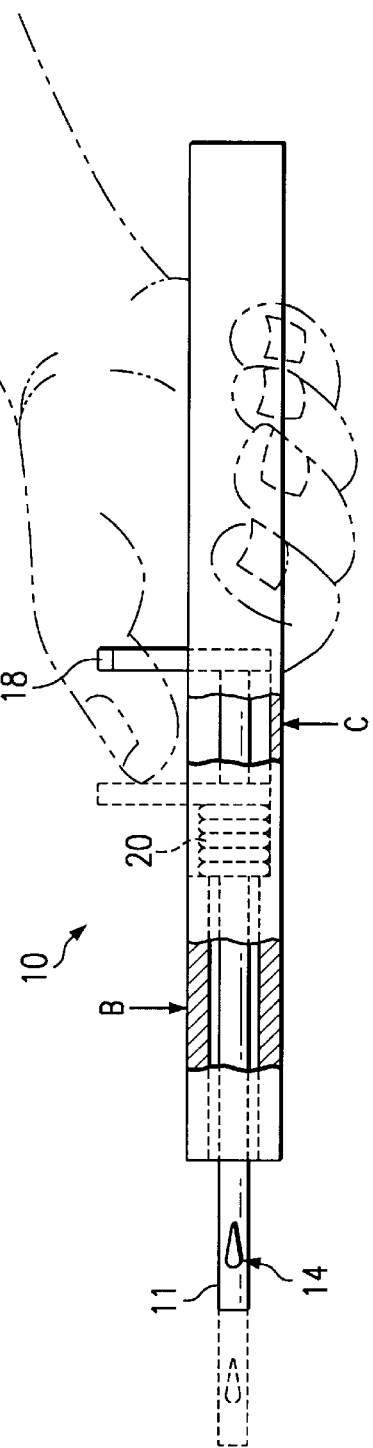

POROUS MEMBRANE SEPARATOR

BACKGROUND OF THE INVENTION

This invention relates in general to tools and, more specifically, to tools for separating porous membranes.

Porous membranes, such as coffee filters, are typically packaged and delivered to the consumer in stacks. Most membranes are very thin. Thus, stacking membranes makes separation difficult, especially for consumers with poor vision or limited finger dexterity. Tools or devices exist that reduce the effort needed to separate stacked porous membranes. However, these devices either have a grasping member that can only be used a limited number of times or an unretractable grasping member. For example, the grasping member of some devices is made of adhesive material. After several uses, the grasping member typically loses its adhesive property or dries up and it will not function properly. Other devices are made with unretractable grasping members that can be easily damaged. When the unretracted grasping member is damaged, it will not work properly, especially when the stack of porous membranes diminishes and becomes less rigid. Additionally, the unretracted grasping member can come into contact with and accidentally damage surfaces or injure the consumer who is using the device.

Therefore, what is needed is a device with a protected grasping member, which does not need to be replaced after a limited number of uses, for separating a porous membrane from a stack of membranes.

SUMMARY OF THE INVENTION

The present invention, accordingly, provides a device with a protected grasping member, which does not need to be replaced after a limited number of uses, for separating a porous membrane from a stack of membranes. To this end, the device for separating a flexible porous membrane from a stack of flexible porous membranes includes a housing with a bore extending from one end of the housing and terminating at a mid-portion of the housing; a stem reciprocatingly disposed in the bore; and a grasping member attached to an end portion of the stem for engaging the flexible porous membrane.

An advantage of the present invention is that it is reusable and allows an individual with poor vision or limited finger dexterity to easily separate one filter from the next.

Another advantage of the present invention is that it has a retractable grasping member, which avoids damage to the grasping member or accidental contact with other surfaces.

DRAWINGS

FIG. 1 is a top view of a device for separating porous membranes.

FIG. 2 is a side view of the device taken along lines A—A, in FIG. 1, with two regions, designated B and C, in partial cutaway view.

DETAILED DESCRIPTION

In FIG. 1, a device, generally designated 10, is shown having a stem 12, a tine 14 for grasping a flexible porous membrane, such as a coffee filter, a housing 16, a handle 18, and a spring 20. The housing 16 has a bore 22 extending from an end 24 of the housing 16 to a mid-portion of the housing 16. The bore 22 has a diameter slightly larger that the diameter of the stem 12. The stem 12 is axially aligned with the bore 22 and a portion of the stem 12 travels back and forth through the bore 22. This allows the stem 12 to be extended and retracted in relation to the housing 16. The bore 22 terminates at a cavity 26. The cavity 26 is located at the mid-portion of the housing 16. The location of the cavity 26 is closer to the end 24 of the housing 16 than an opposite end 25 of the housing 16 to allow sufficient space for a comfortable grip.

An end 13 of the stem 12 extends through the bore 22 into the cavity 26. The handle 18 is attached to the end 13 of the stem 12. One end of the handle 18 is located in the cavity 26 and an opposite end extends out of the cavity 26, perpendicular to the housing 16. Although various handle sizes and shapes are contemplated, in an embodiment of the present invention the handle 18 is 0.625 of one inch in height and 0.375 of one inch in width with the upper corners beveled.

The spring 20 is located in the cavity 26. The spring 20 is coaxially disposed about the stem 12. One end of the spring 20 rests against the handle 18. The other end of the spring 20 rests against a wall 28 of the cavity 26 where the bore 22 terminates. The diameter of the spring 20 is larger than the bore 22. This prevents penetration of the spring 20 into the bore 22. Consequently, the spring 20 holds the stem 12 in a retracted position.

The tine 14 is attached at the end portion 11 of the stem 12. The tine 14 forms an acute angle 29 with the axis of the stem 12. Although the tine 14 can vary in length, in an embodiment of the present invention the tine 14 is approximately 0.040 of one inch in length. When the stem 12 is retracted, the tine 14 will be in close proximity to the end 24 of the housing 16. Specifically, the tine 14 will be within 0.10 of one inch from the end 24, which protects the tine 14 from damage or accidental contact as discussed below.

In FIG. 2, the device 10 is shown from the directional view A—A. The housing 16 is shown with two cuts at B and C to show the stem 12 with the bore 22 and the cavity 26 with the stem 12 and the spring 20, respectively. The user manually extends the stem 12 using the handle 18, which results in compression of the spring 20. When the handle 18 is released, the spring 20 expands to retract the stem 12 into the cavity 26 and toward the housing 16. As discussed above, the stem 12 retracts toward the housing 16 until the tine 14 is within 0.10 of one inch from the end 24 of the housing 16. Close proximity of the tine 14 to the end 24 of the housing 16 acts as a shield for the tine 14 and prevents accidental damage to the tine 14. Furthermore, when the tine 14 is retracted, the tine 14 can not come into accidental contact with and damage other surfaces, such as the flexible porous membrane, clothing or the user's skin.

In operation, the user will grip the housing 16 between the end 25 and the cavity 26. The user's hand will be positioned such that the user's thumb is able to push the handle 18 toward the end 24 of the housing 16 in order to simultaneously extend the stem 12 and compress the spring 20. With the stem 12 extended, the user can bring the tine 14 into contact with and engage the flexible porous membrane. Once the flexible porous membrane is engaged, the user can separate the flexible porous membrane from the stack of flexible porous membranes with a gentle pulling motion away from the stack of flexible porous membranes.

In another embodiment of the present invention the tine 14 is replaced by a hook (not shown) for grasping the flexible porous membrane.

In another embodiment of the present invention the tine 14 is replaced by a hook part of a hook and loop type system such as Velcro (not shown) for grasping the flexible porous membrane.

Although illustrative embodiments have been shown and described, a wide range of modifications, changes and substitutions is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A device for separating a flexible porous membrane from a stack of flexible porous membranes, the device comprising:

a housing defining a bore extending from one end of the housing and terminating at a mid-portion of the housing;

a stem having a first end portion reciprocatingly disposed in the bore; and a tine attached to a second end portion of the stem and extending at an angle toward the housing for engaging the membrane, wherein the second end portion is exterior to the housing.

2. The device of claim 1 wherein the housing further defines a cavity at the termination of the bore for receiving the first end portion of the stem and a biasing element located between a wall of the cavity adjacent the bore and a handle extending outward from the cavity.

3. The device of claim 2 wherein the biasing element is a spring coaxially disposed about the second end portion of the stem.

4. The device of claim 1 wherein the stem is movable between a first and second position such that the tine is located in close proximity to the housing in the first position and extended to engage the membrane in the second position.

5. A method for separating one flexible porous membrane from a stack of flexible porous membranes, the method comprising:

extending an end of a stem away from a housing;

grasping the membrane using a tine located at the extended end of the stem and angled toward the housing, wherein the extended end of the stem is exterior to the housing; and moving the stem away from the stack of membranes thereby separating the membrane from the stack of membranes.

* * * * *